US011274594B2

(12) United States Patent
Lissner et al.

(10) Patent No.: US 11,274,594 B2
(45) Date of Patent: Mar. 15, 2022

(54) VENTILATION DEVICE FOR A MOTOR VEHICLE

(71) Applicant: Valeo Systemes Thermiques, Le Mesnil Saint Denis (FR)

(72) Inventors: Michael Lissner, Le Mesnil Saint Denis (FR); Amrid Mammeri, Le Mesnil Saint Denis (FR); Kamel Azzouz, Le Mesnil Saint Denis (FR); Farid Bakir, Le Mesnil Saint Denis (FR); Sofiane Khelladi, Le Mesnil Saint Denis (FR); Ivan Dobrev, Le Mesnil Saint Denis (FR)

(73) Assignee: Valeo Systemes Thermiques, Le Mesnil Saint Denis (FR)

( * ) Notice: Subject to any disclaimer, the term of this patent is extended or adjusted under 35 U.S.C. 154(b) by 0 days.

(21) Appl. No.: 17/255,737

(22) PCT Filed: Jun. 24, 2019

(86) PCT No.: PCT/FR2019/051537
§ 371 (c)(1),
(2) Date: Dec. 23, 2020

(87) PCT Pub. No.: WO2020/002808
PCT Pub. Date: Jan. 2, 2020

(65) Prior Publication Data
US 2021/0277818 A1    Sep. 9, 2021

(30) Foreign Application Priority Data

Jun. 26, 2018 (FR) ...................... 1855727

(51) Int. Cl.
*F01P 7/02* (2006.01)
*F01P 3/20* (2006.01)
(Continued)

(52) U.S. Cl.
CPC ................ *F01P 7/02* (2013.01); *B60K 11/04* (2013.01)

(58) Field of Classification Search
CPC .. F01P 2060/12; F01P 3/20; F01P 5/02; F01P 7/02; F02B 29/0431; F02B 29/0456;
(Continued)

(56) References Cited

U.S. PATENT DOCUMENTS

2004/0118389 A1* 6/2004 Shaffer ............... F02B 29/0475
123/563
2007/0209783 A1* 9/2007 Rohellec ................. F28F 9/262
165/109.1
(Continued)

FOREIGN PATENT DOCUMENTS

CN    112534123 A    3/2021
DE    4023260 A1    2/1991
(Continued)

OTHER PUBLICATIONS

International Search Report and Written Opinion in corresponding International Application No. PCT/FR2019/051537, dated Sep. 13, 2019 (13 pages).
(Continued)

*Primary Examiner* — Long T Tran
(74) *Attorney, Agent, or Firm* — Osha Bergman Watanabe & Burton LLP

(57) ABSTRACT

The invention relates to a ventilation device for a motor vehicle, comprising at least one manifold (5-1, 5-2) for distributing air to the tubes (3), at least one turbomachine (26) being arranged in said at least one manifold (5-1, 5-2), said at least one turbomachine (26) comprising a cross-flow fan (26), said at least one manifold (5-1, 5-2) forming a volute (30) of the cross-flow fan (26).

12 Claims, 7 Drawing Sheets

(51) Int. Cl.
*B60K 11/04* (2006.01)
*F02B 29/00* (2006.01)

(58) Field of Classification Search
CPC ............. F02B 29/0425; F28D 1/05366; F28D 1/05375; B60K 11/04
See application file for complete search history.

(56) References Cited

U.S. PATENT DOCUMENTS

| | | | | |
|---|---|---|---|---|
| 2008/0169092 | A1* | 7/2008 | Kardos | F28D 1/0435 165/157 |
| 2011/0284186 | A1* | 11/2011 | Hirai | F28F 9/0282 165/104.19 |
| 2015/0328979 | A1 | 11/2015 | Matsuo et al. | |
| 2017/0010056 | A1* | 1/2017 | Liedtke | F28D 7/1692 |
| 2020/0318642 | A1* | 10/2020 | Lissner | F04F 5/16 |

FOREIGN PATENT DOCUMENTS

| | | |
|---|---|---|
| DE | 102008020310 A1 | 10/2009 |
| DE | 102009032601 A1 | 1/2011 |
| EP | 0233174 A1 | 8/1987 |
| GB | 885223 A | 12/1961 |

OTHER PUBLICATIONS

First Office Action in corresponding Chinese Application No. 201980049888.9, dated Dec. 8, 2021 (12 pages).

* cited by examiner

VENTILATION DEVICE FOR A MOTOR VEHICLE

The invention concerns a ventilation device for a motor vehicle.

The invention relates to the field of motor vehicles, and more particularly to the field of air circulation for cooling the engine and its equipment.

Motor vehicles, whether of the combustion or electric type, have to discharge the heat generated by their operation, and are equipped with heat exchangers for this purpose. A motor vehicle heat exchanger usually comprises tubes in which a heat transfer fluid, notably a liquid such as water, is designed to circulate, and heat exchange elements connected to these tubes, often designated by the term "fins" or "spacers". The fins may be used to increase the exchange surface between the tubes and the ambient air.

However, in order to increase further the heat exchange between the heat transfer fluid and the ambient air, a ventilation device is commonly used in addition, to generate or increase an air flow directed toward the tubes and fins.

Such a ventilation device most commonly comprises a propeller fan, which has a number of drawbacks.

In the first place, the assembly formed by the propeller fan and its propulsion device occupies a considerable space.

Furthermore, the distribution of the air formed by the propeller, often placed in the center of the tube array, is not uniform over the whole surface of the heat exchanger. In particular, certain regions of the heat exchanger, such as the ends of the heat transfer tubes and the corners of the heat exchanger, are not reached, or only reached to a small extent, by the air flow ejected by the propeller.

Furthermore, when it is not found necessary to put the ventilation device into operation, notably when the heat exchange with the ambient air is sufficient to cool the heat transfer fluid, the blades of the propeller partially obstruct or "mask" the flow of the ambient air toward the tubes and fins. This limits the heat exchange between the ambient air, on the one hand, and the tube and fins, on the other hand.

Moreover, in this case, the engine friction is reduced less rapidly, thus increasing the fuel consumption of the vehicle and consequently the carbon dioxide emission.

One object of the invention is to provide a ventilation device for a heat exchanger that does not exhibit at least some of the drawbacks of the known ventilation devices for heat exchangers.

For this purpose, the invention proposes a ventilation device for a motor vehicle, comprising at least one manifold for distributing air to the tubes, at least one turbomachine being arranged in said at least one manifold, said at least one turbomachine comprising a cross-flow fan, said at least one manifold forming a volute of the cross-flow fan.

Thus, advantageously, the plurality of tubes from which air is ejected makes it possible to replace the conventional propeller placed in front of the heat transfer fluid circulation tubes of the heat exchanger, without suffering from any of the drawbacks mentioned above.

This is because, for an equal heat exchange capacity, the volume occupied by such a ventilation device is much smaller than a ventilation device using a propeller. Furthermore, the distribution of the ventilated air by the tubes is easier to control and can be made more uniform.

Additionally, because of the device according to the invention, the obstruction of the air flow toward the heat exchanger is limited. This is because the tubes of the ventilation device can advantageously be placed facing low heat exchange areas of the heat exchanger, called "dead areas", such as the front faces of the tubes through which the heat transfer fluid passes, which are not in contact with the cooling fins. This cannot be done with a conventional propeller.

The invention also makes it possible to place the air ejection means that supply the air flow to the tubes of the ventilation device at a distance from the array of heat transfer fluid circulation tubes, thus providing greater freedom in the design of the heat exchanger.

According to another characteristic of the invention, the device comprises at least one manifold for distributing air to the tubes, at least one turbomachine being arranged in said at least one manifold, said at least one turbomachine comprising a cross-flow fan, said at least one manifold forming a volute of the cross-flow fan.

According to another characteristic of the invention, the volute comprises an air inlet into the manifold through which an air flow can be drawn by the cross-flow fan, and an air outlet through which the air flow drawn in can be distributed to the tubes, the tubes extending parallel to a longitudinal direction of the tubes, called the longitudinal direction, the cross-flow fan extending in a direction orthogonal to the longitudinal direction, called the intake direction, another direction, called the direction of advance, orthogonal to the longitudinal direction and the intake direction, coinciding with a direction of advance of the vehicle when the ventilation device is installed in the vehicle.

According to another characteristic of the invention, the air inlet comprises a first inlet wall at an angle of between 40° and 75°, preferably 58°, to said longitudinal direction.

According to another characteristic of the invention, one end of the first wall opposed to the air inlet is curved in a plane containing the longitudinal direction and the direction of advance, the length of this end being between 1 mm and 8 mm, and a minimum distance between said end and a disk delimited by the cross-flow fan in said plane is between 0.5 mm and 1.5 mm.

According to another characteristic of the invention, the air inlet comprises a second inlet wall comprising a rounded edge shaped so that its curvature in a plane containing the longitudinal direction and the direction of advance is an arc of a circle whose center is located on a concentric circle of a disk delimited by the cross-flow fan in said plane.

According to another characteristic of the invention, the device comprises a part forming a junction of the air inlet of the volute and air outlet of the volute, called the intermediate part, shaped to house the cross-flow fan.

According to another characteristic of the invention, said intermediate part comprises a wall, called the intermediate wall, curved along an arc of a circle in a plane containing the longitudinal direction and the direction of advance, said arc of a circle having a center distinct from the center of a disk delimited by the cross-flow fan in said plane.

According to another characteristic of the invention, a distance between the center of the intermediate wall and the center of the disk is smaller than or equal to the value of the radius of the disk.

According to another characteristic of the invention, a section of the intermediate part at an interface between the intermediate part and the air outlet is at an angle, preferably a non-zero angle, to the longitudinal direction, preferably within the range [0° 20], or, also preferably, within the range]0°, 20°].

According to another characteristic of the invention, the cross-flow fan is capable of creating an air flow with a flow rate of between 0 and 750 m$^3$/h and a pressure of between 0 and 900 Pa. For this purpose, the cross-flow fan comprises a rotor whose rotation speed may be between 2000 r.p.m. and 13,000 r.p.m., preferably between 2500 r.p.m. and 9000 r.p.m.

For this purpose, one or more of the following characteristics, considered individually or in combination, may, notably, be provided:
- the rotor is formed of a plurality of stages of blades separated by reinforcing disks;
- the rotor has a blade height, defined as the sum of the heights of the different stages of blades, measured parallel to the axis of rotation of the rotor, of between 100 and 600 mm;
- each stage of blades has a height, measured parallel to the axis of rotation of the rotor, of between 16 and 33 mm;
- each reinforcing disk has a thickness, measured parallel to the axis of rotation of the rotor, of between 0.8 and 1.5 mm;
- each stage of blades comprises between 15 and 30 blades, preferably between 20 and 28 blades;
- the various blades of each stage of blades 51 are inscribed in a ring having an inside diameter Dint and an outside diameter Dext;
- the inside diameter is between 0 and 84 mm, preferably between 60 and 84 mm;
- the outside diameter is between 35 and 120 mm, preferably between 60 and 120 mm;
- each blade has a crescent-shaped cross section, the blades preferably being substantially cylindrical;
- a pitch angle γ of each blade, defined as the angle between the chord of the blade and axis connecting the axis of rotation of the rotor to the geometric center of the cross section of the blade 53, is between 0 and 30°;
- an angle of flow at the leading edge of each blade, defined as the angle between the current line at the leading edge of the blade and the tangent to the outside diameter of the rotor, is between 0° and 40°, preferably between 10° and 20°;
- an angle of flow at the trailing edge of each blade, defined as the angle between the current line at the trailing edge of the blade and the tangent to the inside diameter of the rotor, is between 60° and 90°, preferably between 70° and 80°;
- the maximum thickness of the cross section of each blade is between 0.35 and 1.6 mm, preferably between 0.8 and 1.2 mm;
- the length of the chord of the cross section of each blade, connecting the leading edge to the trailing edge of the cross section of each blade, along a rectilinear segment, is between 6 and 8 mm;
- the rotor is formed of a plurality of portions, rolling bearings being placed between each portion; and
- the rotor is formed of a number of portions that is less than 4.

Other characteristics and advantages of the invention will be apparent from a perusal of the following description. This description is purely illustrative and should be read in conjunction with the appended drawings, in which.

Heat Exchange Module

The invention concerns a ventilation device 1 for a motor vehicle.

The invention also concerns a heat exchange module 100, comprising the ventilation device 1 and a heat exchanger 101.

Figure 1:
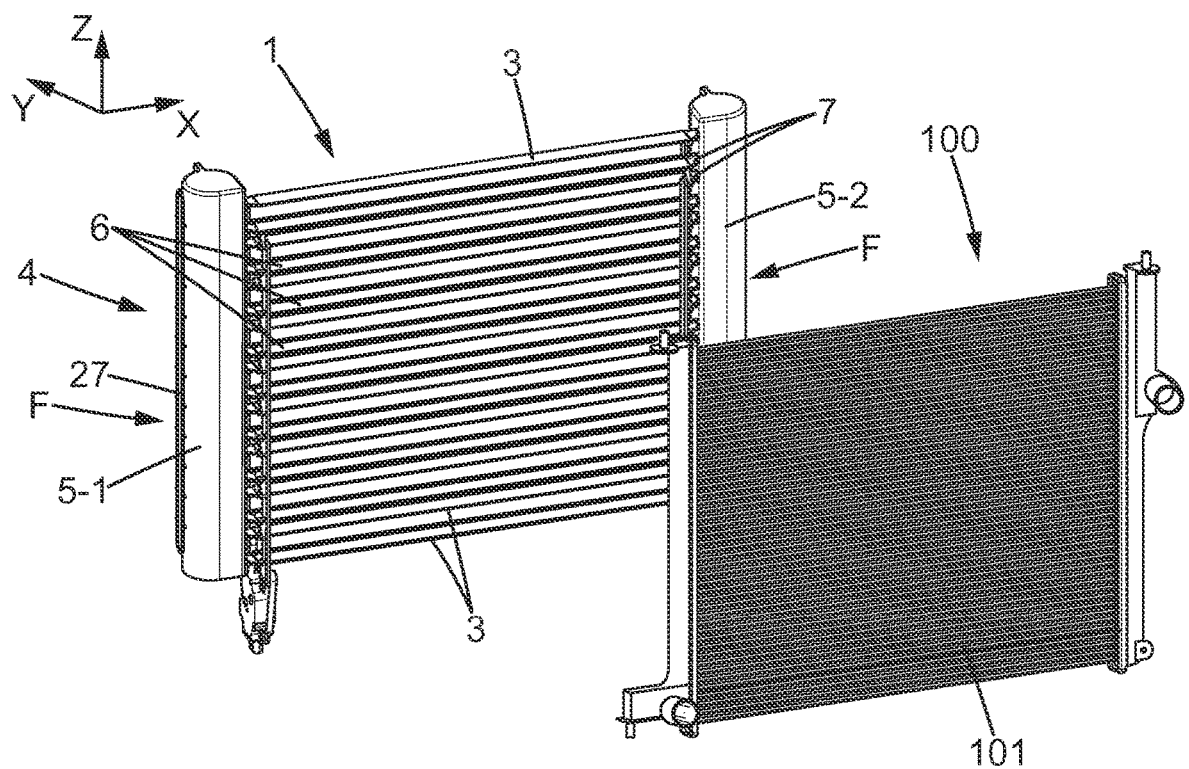
FIG. 1 shows an exploded perspective view of a heat exchange module equipped with a ventilation device as claimed in the present invention.

As may be seen in FIG. 1, the ventilation device 1 and the heat exchanger 101 are positioned relative to each other in such a way that an air flow put into motion by the ventilation device 1 supplies air to the heat exchanger, preferably for cooling the engine of the motor vehicle.

The ventilation device 1 is positioned upstream of the heat exchanger 101 in FIG. 1 (relative to an air flow from the outside of the moving vehicle).

However, the ventilation device may also be positioned downstream of the heat exchanger 101.

Ventilation Device

As may be seen in the drawings, the ventilation device 1 comprises a plurality de tubes 3.

The tubes 3 are substantially rectilinear, parallel to each other, and aligned so as to form an array of tubes.

When the exchange module is installed in the motor vehicle, the tubes 3 may be positioned horizontally, parallel to a longitudinal direction of the ventilation device, denoted X. According to another possible embodiment of the exchange module (not shown in the figures), the tubes may be positioned vertically.

A vertical direction is denoted Z.

A direction orthogonal to the directions X and Z, coinciding with a direction of advance of the vehicle, is denoted Y.

The ventilation device 1 also comprises a device for supplying air to an air flow F.

This device supplies the ventilation tubes 3 via an air supply circuit 4.

The air supply circuit 4 comprises, notably, two air intake manifolds 5-1, 5-2 to which the ventilation tubes 3 are connected by means of air supply inlets located at each of their ends 6, 7.

Advantageously, the supply circuit also comprises one or more turbomachines 26 for ejecting the air through the intake manifolds 5-1, 5-2 into the ventilation tubes 3.

Advantageously, each turbomachine is a cross-flow fan.

In FIG. 1, the cross-flow fan 26 is housed in the manifold 5-1.

The manifold 5-1 comprises a single opening 27 extending along the manifold 5-1.

Figure 2:
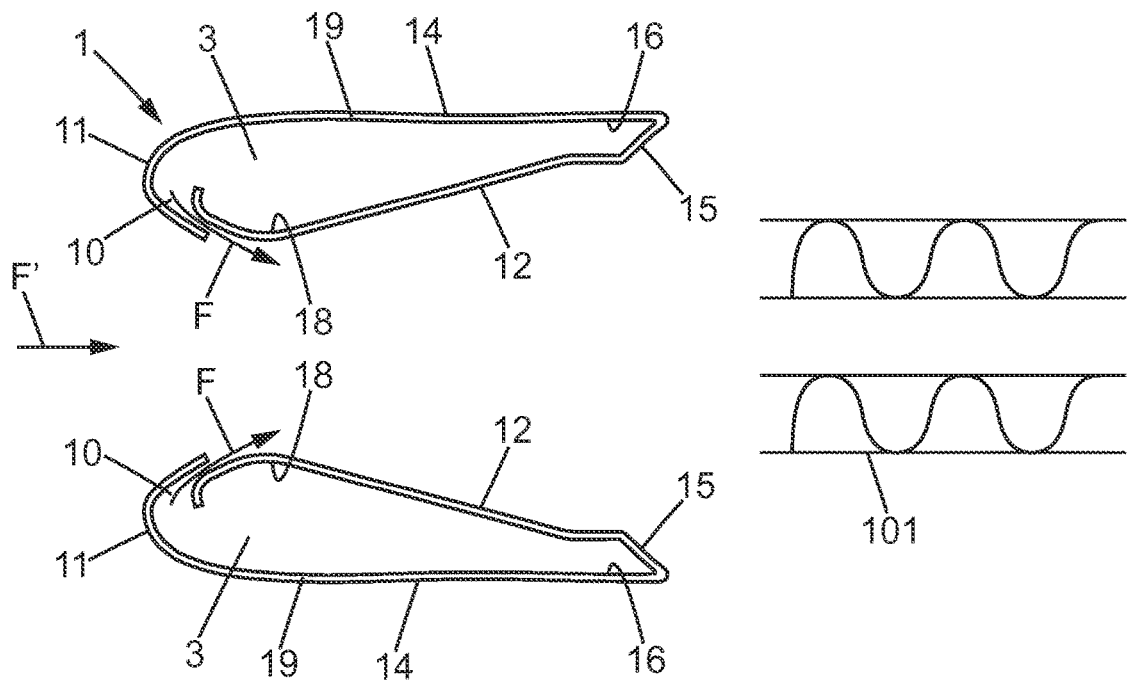
FIG. 2 shows a cross-sectional view of two tubes of FIG. 1.

As may be seen in FIG. 2, each ventilation tube 3 comprises at least one opening 10 distinct from the ends 6, 7, for ejecting air from the tube 3.

Preferably, the openings 10 are designed to be positioned facing the heat exchanger.

As may be seen in FIG. 2, each tube 3 comprises a longitudinal wall 19 having a cross section comprising a free leading edge 11, a trailing edge 15 and a first and a second profile 12, 14, each extending between the leading edge 11 and the trailing edge 15.

The trailing edge 15 is preferably positioned facing the heat exchanger.

The longitudinal wall 19 is delimited by an inner surface 16 and an outer surface 18.

Each opening 10 is formed in the longitudinal wall 19 of the tube 3, preferably in one or other of the profiles 12, 14. Alternatively, an opening 10 may be formed in the longitudinal wall 19 of the tube, in the two profiles 12, 14.

In FIG. 2, each opening 10 is positioned in the proximity of the leading edge 11.

As may also be seen in FIG. 2, the openings 10 of the pair of tubes 3 shown are formed in the profiles 12 facing each other.

Thus the ventilation tubes 3 and their openings 10 are configured in such a way that the air flow F circulating in the ventilation tubes 3 is ejected by the opening 10 by flowing along each profile 12, substantially as far as their trailing edges 52, by the Coanda effect.

The air flow F ejected from the tubes 3 enables another flow F to be accelerated in a direction of flow toward the heat exchanger.

It should be noted that the cross sections of the tubes 3 are such that the profiles 12 extend in a direction of the tubes 3 leading away from the leading edges 11 to the trailing edges 15.

Turbomachines of the Ventilation Device

As indicated above, a turbomachine 26 for ejecting the air through the intake manifolds 5-1, 5-2 into the ventilation tubes 3 is advantageously accommodated in each intake manifold 5-1, 5-2. Also advantageously, each of these turbomachines is a cross-flow fan 26 comprising a rotor 50.

The rotor 50 of the cross-flow fan 26 is advantageously shaped to create an air flow with a flow rate of between 0 and 750 m$^3$/h and a corresponding air pressure of between 0 and 900 Pa. The corresponding rotation speed of the rotor 50 is, for example, between 2000 r.p.m. and 13,000 r.p.m., preferably between 2500 r.p.m. and 9000 r.p.m. Thus the rotation speed of the rotor 50 of the cross-flow fan 26 is optimized to provide an air flow rate permitting effective cooling of the heat exchange module.

A first example of a rotor 50 of such a cross-flow fan 26 is shown in FIGS. 8 to 12.

This first example of a rotor 50 is formed of a plurality of stages 51 of blades (or vanes) separated by reinforcing disks 52. In this case, the rotor 50 comprises thirteen stages of blades 51. Overall, the rotor 50 has a blade height H51, defined as the sum of the heights of the different stages of blades 51, measured parallel to the axis A50 of rotation of the rotor 50, of between 100 and 600 mm; Each stage of blades 51 has a height h51, measured parallel to the axis A50 of rotation of the rotor 50, of between 16 and 33 mm. These dimensions are intended to enable the desired air flow rate to be provided.

Each reinforcing disk 52 has, for example, a thickness, also measured parallel to the axis A50 of rotation of the rotor 50, of between 0.8 and 1.5 mm. These dimensions make it possible, notably, to ensure the mechanical strength of the rotor 50.

Figure 10:
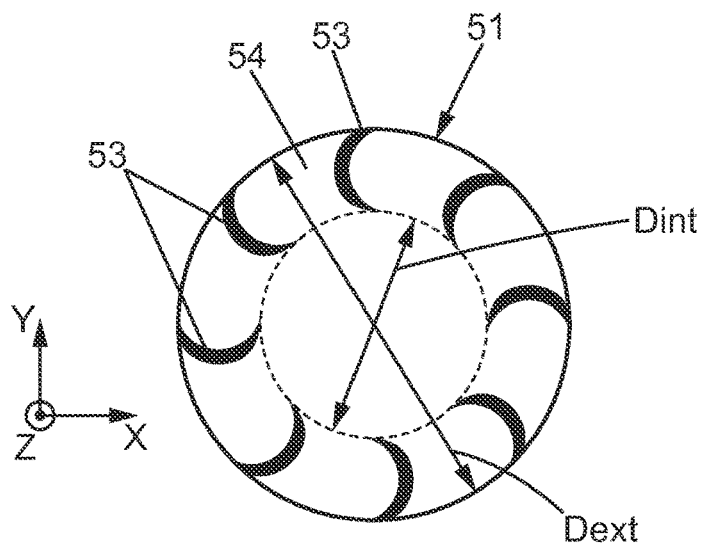
FIG. 10 is a schematic cross-sectional view of the rotor of FIGS. 8 and 9.

As may be seen in FIG. 10, notably, each stage of blades 51 may, for example, comprise between 15 and 30 blades 53 (or vanes), preferably between 20 and 28 blades. It should be noted here that the blades 53 may be used not only to obtain a desired air flow, but also to stiffen the rotor 50.

The various blades 53 of each stage of blades 51 are inscribed in a ring 54 having an inside diameter Dint and an outside diameter Dext. The inside diameter Dint is, for example, between 0 and 84 mm, preferably between 60 and 84 mm. The outside diameter Dext is, for example, between 35 and 120 mm, preferably between 60 and 120 mm.

Each blade 53 has a crescent-shaped cross section in a plane (X, Y). The shape of a blade 53 is described more precisely below, with reference to FIGS. 11 and 12 which show the cross section of a blade 53 in a plane (X, Y), the blades being substantially cylindrical with an axis parallel to the direction Z, which is vertical in this case.

Figure 11:
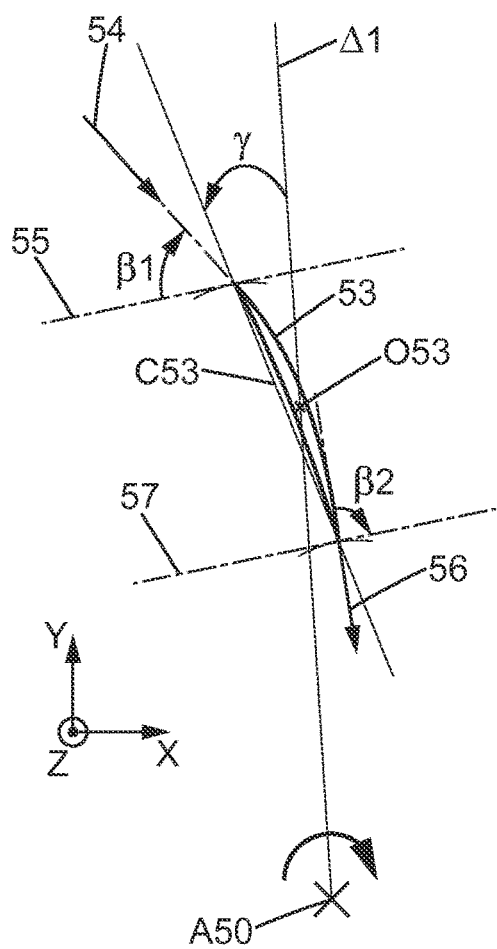
FIGS. 11 and 12 are schematic cross-sectional views of a blade of the rotor of FIGS. 8 and 9.
Figure 12:
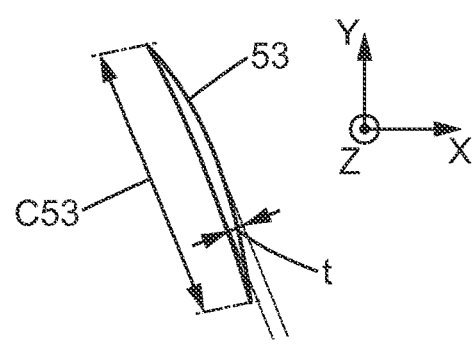

As may be seen in FIG. 11, a pitch angle γ of a blade 53 is defined as the angle between the chord c53 of the blade 53 and an axis Δ1 which, in the plane (X, Y) of FIG. 11, connects the axis of rotation A50 of the rotor to the geometric center $O_{53}$ of the blade 53. This pitch angle γ is, for example, between 0 and 30°.

Additionally, an angle of flow at the leading edge β1 is defined as the angle between the current line at the leading edge 54 and the tangent 55 to the outside diameter of the rotor 50. The angle of flow at the leading edge β1 is, for example, between 0° and 40°, preferably between 10° and 20°.

Additionally, an angle of flow at the trailing edge β2 is defined as the angle between the current line at the trailing edge 56 and the tangent 57 to the inside diameter of the rotor 50 at the trailing edge. This angle of flow at the trailing edge β2 is, for example, between 60° and 90°, preferably between 70° and 800.

The maximum thickness t of the cross section of each blade 53, measured in a plane (X, Y), is for example between 0.35 and 1.6 mm, preferably between 0.8 and 1.2 mm.

Finally, the length of the chord c53 of the cross section of each blade 53, connecting the leading edge to the trailing edge of the blade 53 in question, along a rectilinear segment in a plane (X, Y), is between 6 and 8 mm.

Figure 13:
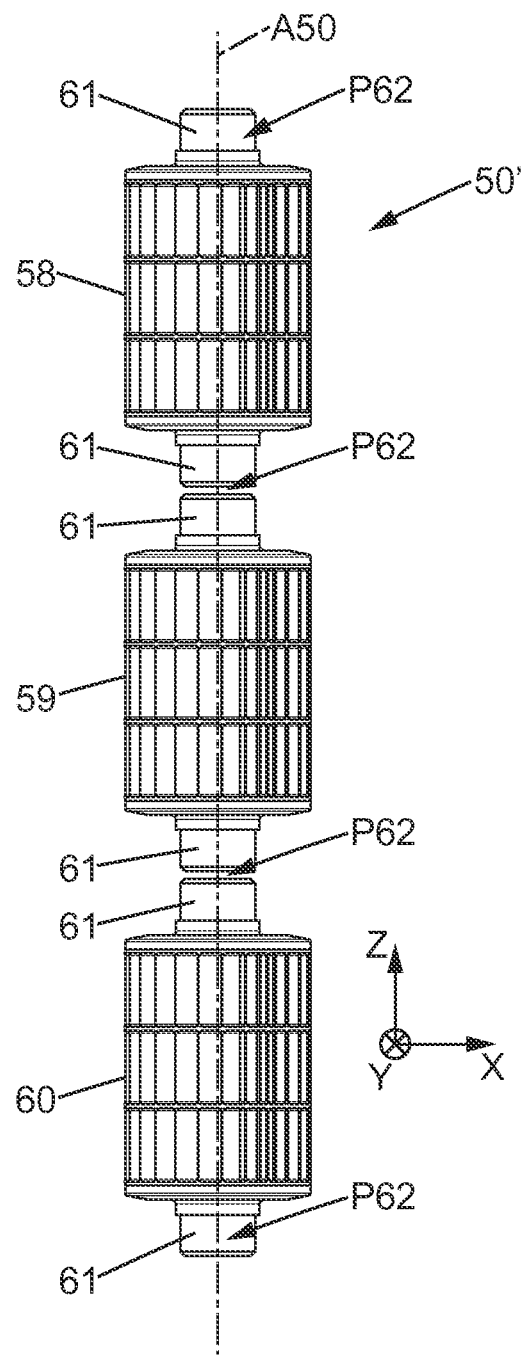
FIG. 13 is a perspective view of a second example of a rotor that may be used in the cross-flow fan inside the manifold shown in FIGS. 3 to 6.

FIG. 13 shows a second example of a rotor 50' for the cross-flow fan 26. This second example of a rotor 50' is distinguished from the first example 50 described above, essentially in that it is formed of a plurality of portions 58, 59, 60. These portions 58, 59, 60 are identical in this case. There are three of the portions 58, 59, 60 in this case. The second example of a rotor 50' may, however, comprise fewer portions 58, 59, 60, for example only two distinct portions, or more portions. Each portion 58, 59, 60 forms one or more stages of blades 51. Especially, in this case, each portion 58, 59, 60 has a pin 61 to be received in a rolling bearing (not shown) at both of its longitudinal ends. A rolling bearing is conventionally formed by a bearing, notably a ball or roller bearing, for example. Rolling bearings may be used, notably, to interrupt natural frequencies and thus to limit resonance phenomena which give rise to significant noise. At a high rotation speed of the rotor 50, 50', it is useful to have a higher number of rolling bearings. Here, with a rotor 50' formed by three portions 58, 59, 60, four bearings may be used, and are placed at the points denoted P62. Advantageously, in the context of the invention, the number of bearings used with the rotor 50, 50' is less than 4. It would also be feasible not to provide any rolling bearing, notably in the case where the height of the rotor 50 is small, notably below 100 mm. In this case, the bearing of the drive rotor that drives the rotor 50, 50' in rotation about its axis of rotation A50 may suffice to keep the rotor 50, 50' stable.

Volute

As shown in FIGS. 3 to 7, the manifold 5-1 delimits a volute 30 of the cross-flow fan 26.

The volute 30 comprises an air inlet 31, an air outlet 32 and a junction part between the air inlet 31 and the air outlet 32, called the intermediate part 33.

The air inlet 31 comprises the opening 27 through which an air flow F is drawn in by the cross-flow fan 26.

The opening 27 is provided with a protective grid 28.

The air outlet 32 is connected to each of the tubes 3 to distribute the air flow F to them.

The intermediate part 33 forms a housing for the cross-flow fan 26.

The intermediate part constitutes a boundary between an intake area A at the inlet 31 and a discharge area B at the outlet 32.

As may be seen in FIGS. 3 to 6, the cross section of the air inlet 31 is convergent from the opening 27, making it possible to accelerate the air flow and avoid any breakaway of the air flow behind the parts having significant changes of angle.

Similarly, the intermediate cross section and the outlet cross section have only minor variations of orientation, as detailed below.

FIGS. 3 to 7 are sectional views in the plane (X, Y), denoted plane P.

As shown in FIGS. 3 to 6, the air inlet 31 comprises a first inlet wall 34, called the lateral intake wall, and a second inlet 35 opposed to the first air inlet 34.

Figure 3:
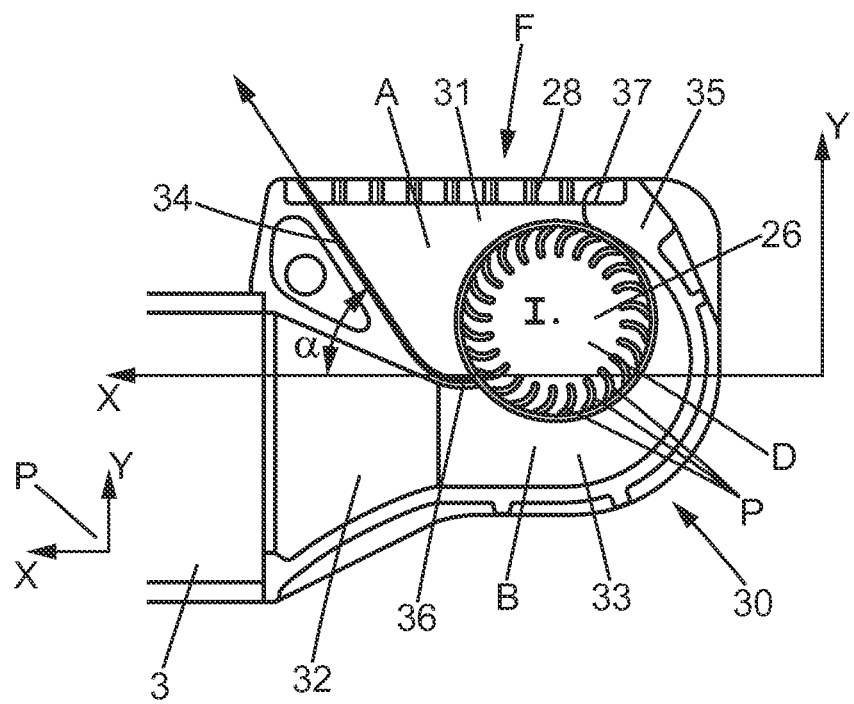
FIGS. 3 to 6 show a cross-sectional view of a manifold of the device of FIG. 1, specific elements being drawn on the sectional view.

As may be seen in FIG. 3, the lateral intake wall 34 is at an angle $\alpha$ of between 40° and 75°, preferably 58°, to the longitudinal direction X.

These values of the angle ensure a turbulence-free flow into the inlet 31 and up to the fan 26.

The lateral intake wall 34 extends from the opening 27 to a curved end 36 near the blades p of the fan 26, called an anti-recirculation lip.

Figure 7:
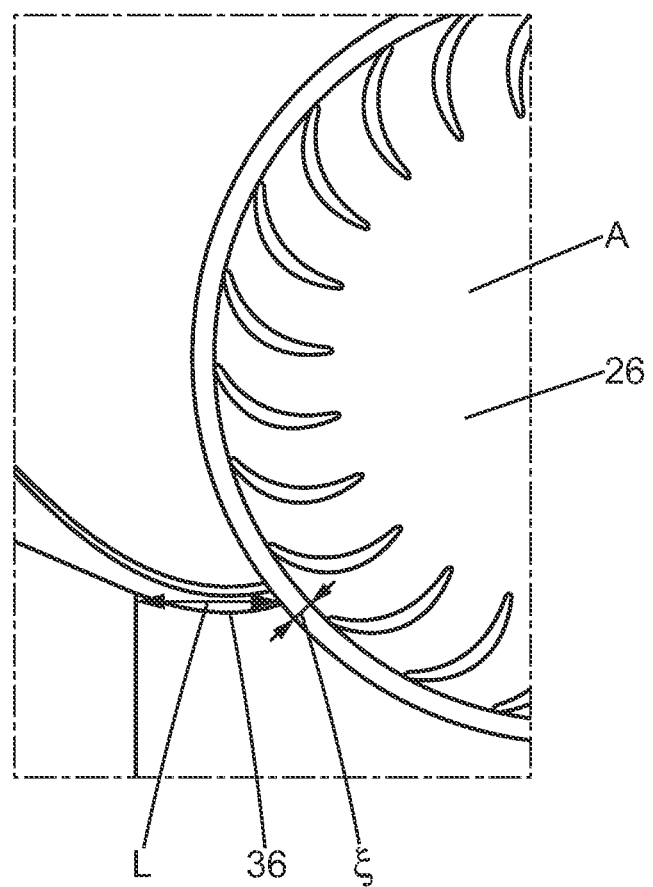
FIG. 7 is a detail view of one of FIGS. 3 to 6.
Figure 8:
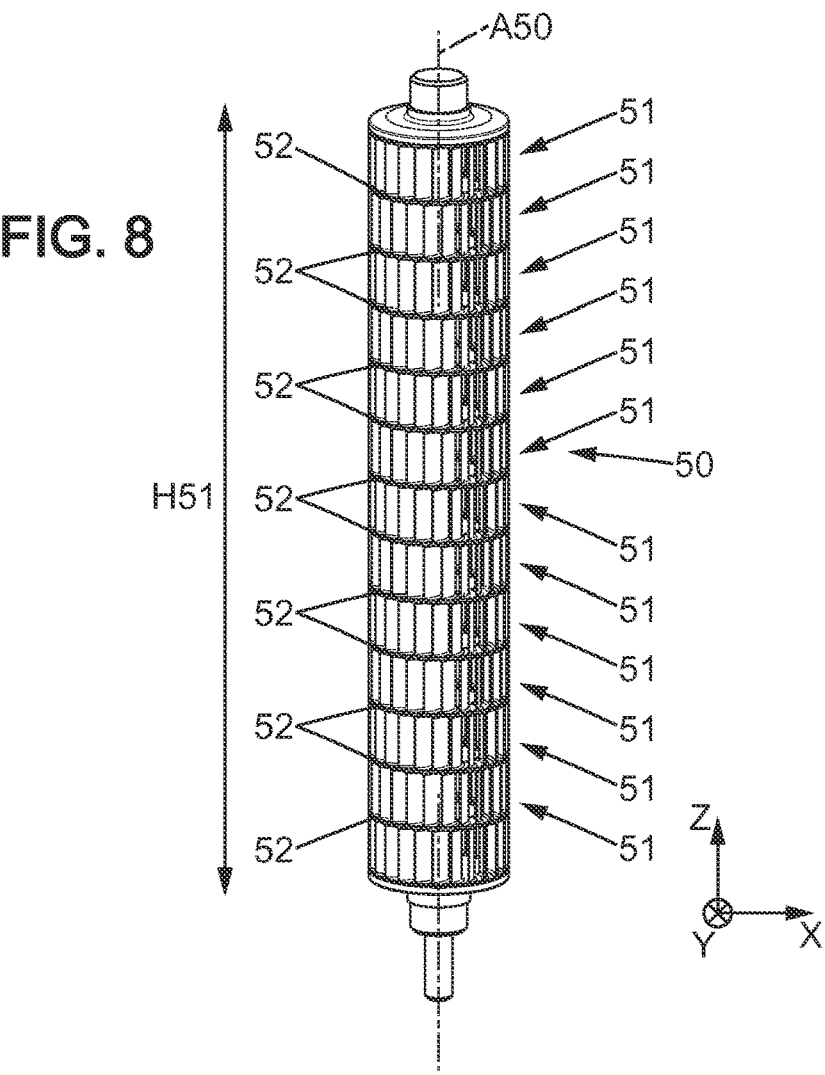
FIG. 8 is a perspective view of a first example of a rotor of the cross-flow fan used in the manifold shown in FIGS. 3 to 6.
Figure 9:
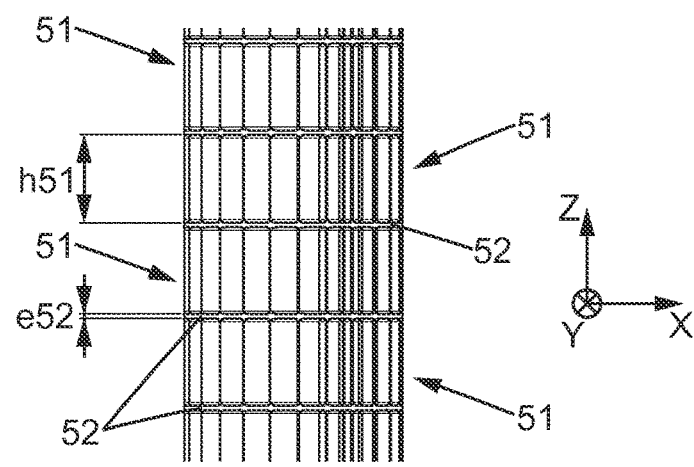
FIG. 9 is a view similar to FIG. 8, showing a detail of the rotor of FIG. 8.

As may be seen in FIG. 7 in particular, the end 36 is positioned between the intake and the discharge, and its curved shape, the dimensions of which are indicated below, prevents any recirculation of air in the volute.

The end 36 is called an anti-recirculation lip.

Preferably, a length L of the lip 36 is between 1 mm and 8 mm, and a minimum distance m between the lip and a disk D delimited by the cross-flow fan in the plane P is between 0.5 mm and 1.5 mm.

As indicated above, these dimensions of the lip 36 enable any recirculation of air in the volute 30 to be prevented despite the high pressure reached in the discharge area B.

Figure 4:
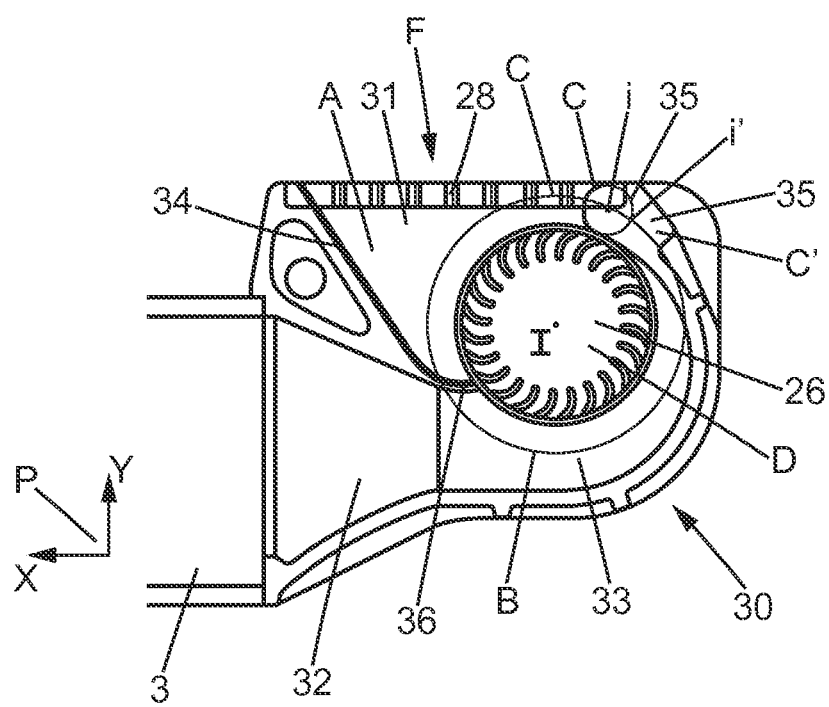

As may be seen in FIG. 4, the second wall 35 of the air inlet 31 comprises a rounded edge 37 of the opening 27.

In FIG. 4, the curvature of the edge 37 is formed by an arc of a circle c, whose center i is located on a concentric circle C of the disk D whose center is denoted I.

In FIG. 4, another circle c', whose center i is located on the circle C, is shown.

Figure 5:
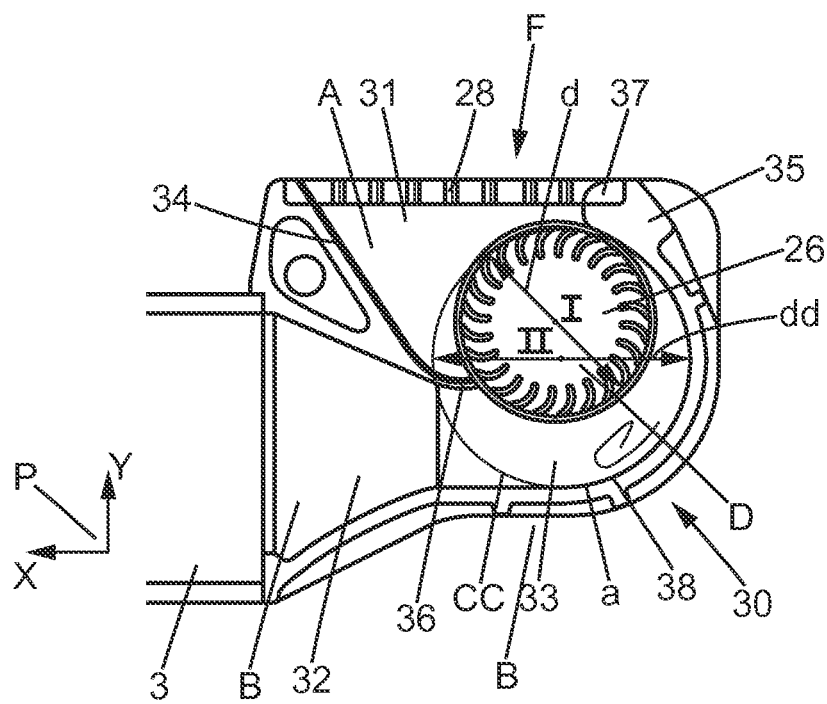

As may be seen in FIG. 5, the intermediate part 33 comprises a wall, called the intermediate wall 38, curved along an arc of a circle a.

The circle CC comprising the arc of a circle a has a center II distinct from the center I of the disk D; that is to say, the circle CC is not concentric with the disk D.

As shown also in FIG. 5, a diameter dd of the intermediate part 33 is greater than a diameter d of the disk D.

Thus the intermediate part 33 has a cross section that increases progressively in a direction of flow of the air between the air inlet 31 and the air outlet 32.

This increase enables the recirculation of air in the volute 30 to be greatly reduced.

Advantageously, a distance between the center II of the intermediate wall 38 and the center I of the disk D is smaller than or equal to the value of the radius of the disk D.

Figure 6:
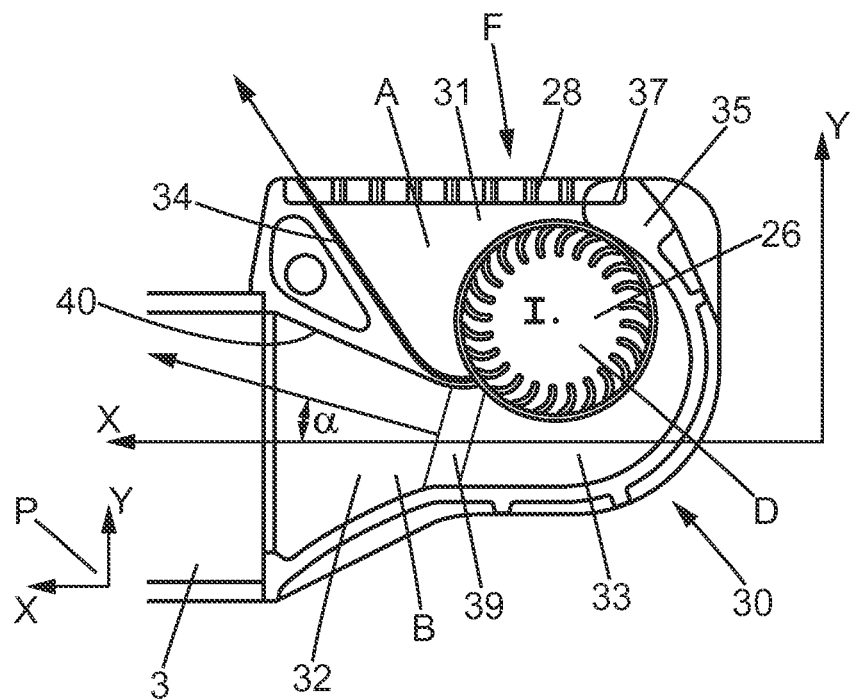

As shown in FIG. 6, a section 39 of the intermediate part 33 at an interface 40 between the intermediate part 33 and the outlet 32 is at an angle $\alpha$, preferably a non-zero angle, to the direction X, which is advantageously within the range [0° 20], or more advantageously within the range]0°, 20°], or even more preferably equal to about 15°.

This angle enables the speed of the air at the outlet of the fan 26 to be made uniform because it increases the length of the path of the air nearer to an outlet wall 40 (compared with a zero angle).

The outlet 32 takes the form of a divergent cone from the intermediate part 33 toward the tubes 3, which also contributes to providing uniformity of speed in the tubes and ensures air distribution over the whole inlet surface of each tube 3.

The invention claimed is:

1. A ventilation device for a motor vehicle, comprising:
    at least one manifold for distributing air to tubes of a heat exchanger of the motor vehicle;
    at least one turbomachine being arranged in said at least one manifold,
    said at least one turbomachine comprising a cross-flow fan,
    said at least one manifold forming a volute of the cross-flow fan.

2. The device as claimed in claim 1, wherein the volute comprises an air inlet into the manifold through which an air flow can be drawn by the cross-flow fan, and an air outlet through which the air flow drawn in can be distributed to the tubes,
    the tubes extending parallel to a longitudinal direction of the tubes, called the longitudinal direction, the cross-flow fan extending in a direction orthogonal to the longitudinal direction, called the intake direction, another direction, called the direction of advance, orthogonal to the longitudinal direction and the intake direction, coinciding with a direction of advance of the vehicle when the ventilation device is installed in the vehicle.

3. The device as claimed in claim 2, wherein the air inlet comprises a first inlet wall at an angle of between 40° and 75° to said longitudinal direction.

4. The device as claimed in claim 2, wherein one end of the first wall opposed to the air inlet is curved in a plane containing the longitudinal direction and the direction of advance, a length of this end being between 1 mm and 8 mm, and a minimum distance between said end and a disk delimited by the cross-flow fan in said plane is between 0.5 mm and 1.5 mm.

5. The device as claimed in claim 3, wherein the air inlet comprises a second inlet wall, said second wall comprising a rounded edge shaped so that its curvature in a plane containing the longitudinal direction and the direction of advance is an arc of a circle whose center is located on a concentric circle of a disk delimited by the cross-flow fan in said plane.

6. The device as claimed in claim 2, further comprising a part forming a junction of the air inlet of the volute and the air outlet of the volute, called the intermediate part, shaped to house the cross-flow fan.

7. The device as claimed in claim 6, wherein said intermediate part comprises a wall, called the intermediate wall, curved along an arc of a circle in a plane containing the longitudinal direction and the direction of advance, said arc of a circle having a center distinct from the center of a disk delimited by the cross-flow fan in said plane.

8. The device as claimed in claim 7, wherein a distance between the center of the intermediate wall and the center of the disk is smaller than or equal to the value of the radius of the disk.

9. The device as claimed in claim 6, wherein a section of the intermediate part at an interface between the intermediate part and the air outlet is at an angle a non-zero angle, to the longitudinal direction within the range [0° 20].

10. The device as claimed in claim 1, wherein the cross-flow fan is capable of creating an air flow with a flow rate of between 0 and 750 $m^3/h$ and a pressure of between 0 and 900 Pa, the cross-flow fan comprising a rotor whose rotation speed is between 2000 r.p.m. and 13,000 r.p.m.

11. A ventilation device for a motor vehicle, comprising:
at least one manifold for distributing air to a plurality of tubes of a heat exchanger;
at least one turbomachine being arranged in said at least one manifold and comprising a cross-flow fan;
said at least one manifold forming a volute of the cross-flow fan,
wherein the plurality of tubes of the ventilation device are disposed facing low heat exchange areas of the heat exchanger, thereby limiting obstruction of the air flow toward the heat exchanger.

12. The ventilation device of claim 11, wherein the plurality of tubes are disposed in front faces of the tubes through which the heat transfer fluid passes, which are not in contact with cooling fins.

* * * * *